United States Patent [19]

Runyan et al.

[11] 4,430,285

[45] Feb. 7, 1984

[54] METHOD AND APPARATUS FOR PREVENTING THERMAL DAMAGE TO A PREFORMED PLUG DURING MOLDING OF A HOUSING THEREAROUND

[75] Inventors: Gary L. Runyan; Paul H. Sloan, Jr., both of Louisville, Ky.

[73] Assignee: Nibco Inc., Elkhart, Ind.

[21] Appl. No.: 314,271

[22] Filed: Oct. 23, 1981

[51] Int. Cl.$^3$ .............................................. B29C 6/02
[52] U.S. Cl. .................................. 264/242; 264/264; 264/279
[58] Field of Search ................ 264/242, 264, 275, 279

[56] References Cited

U.S. PATENT DOCUMENTS

| | | |
|---|---|---|
| 3,094,376 | 6/1963 | Thomas . |
| 3,202,749 | 8/1965 | White . |
| 3,807,692 | 4/1974 | Urab et al. ........................ 251/315 |
| 4,180,542 | 12/1979 | Wrosman ............................ 264/242 |
| 4,257,575 | 3/1981 | Runyan ............................... 251/292 |

FOREIGN PATENT DOCUMENTS

| | | | |
|---|---|---|---|
| 1222559 | 2/1971 | United Kingdom | ............... 264/242 |
| 1325546 | 8/1973 | United Kingdom | ............... 264/242 |

Primary Examiner—James B. Lowe
Attorney, Agent, or Firm—Price, Heneveld

[57] ABSTRACT

A rotary plug valve is formed which is of the type comprising a housing formed of a polymer and a rotary plug disposed in a through-passage of the housing. The plug is formed of a polymer and includes a bore selectively alignable with the through-passage to admit the passage of fluid. The plug valve is formed by forming the plug and attaching thereto a preformed polymeric shield by snap-fitting the shield onto the plug. The shield has an inner surface conforming to the periphery of the plug. The plug and shield assembly is positioned within a cavity of a mold. The cavity corresponds to the shape of the housing. A molten polymer is introduced into the cavity and intimately contacts the shield and forms the housing around the plug.

21 Claims, 11 Drawing Figures

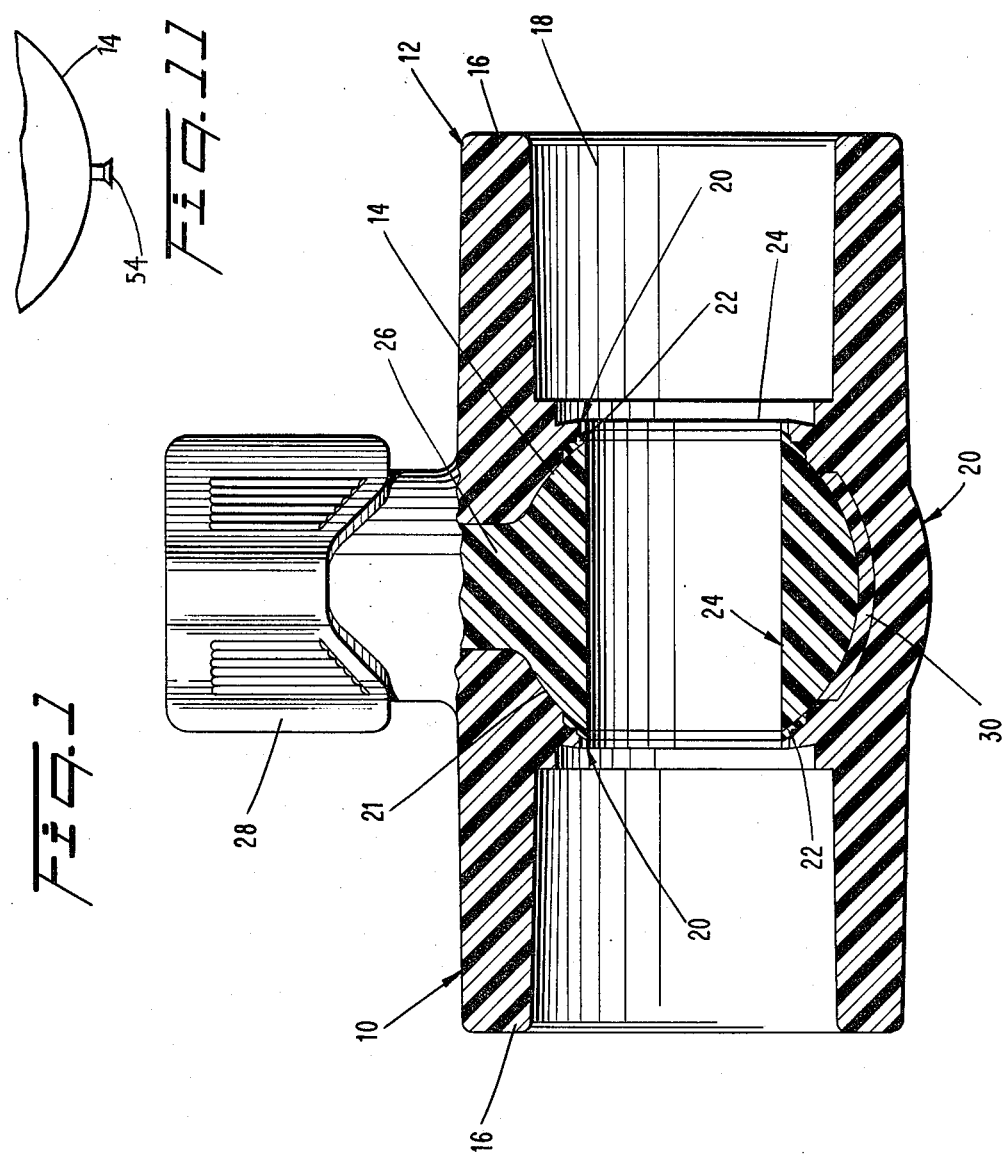

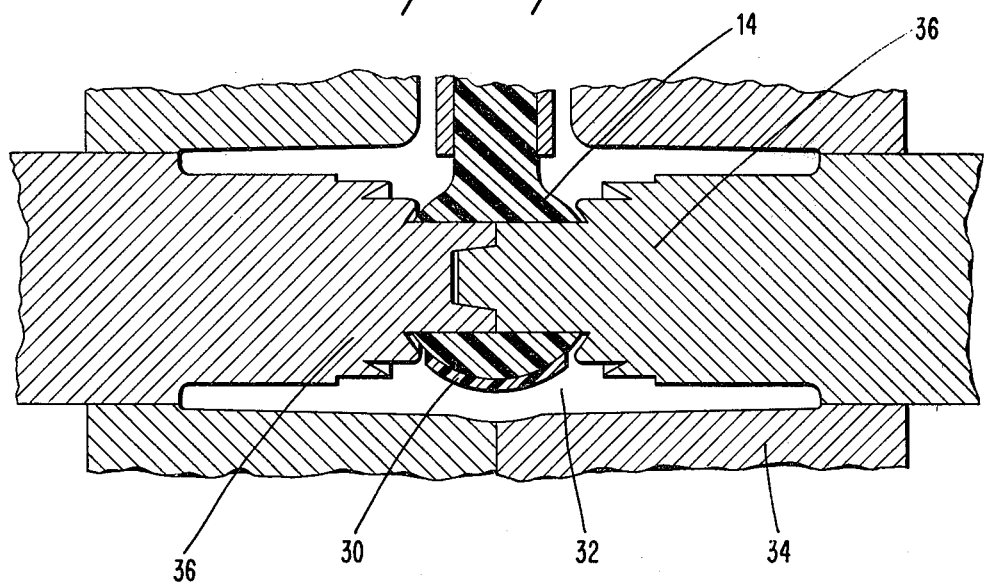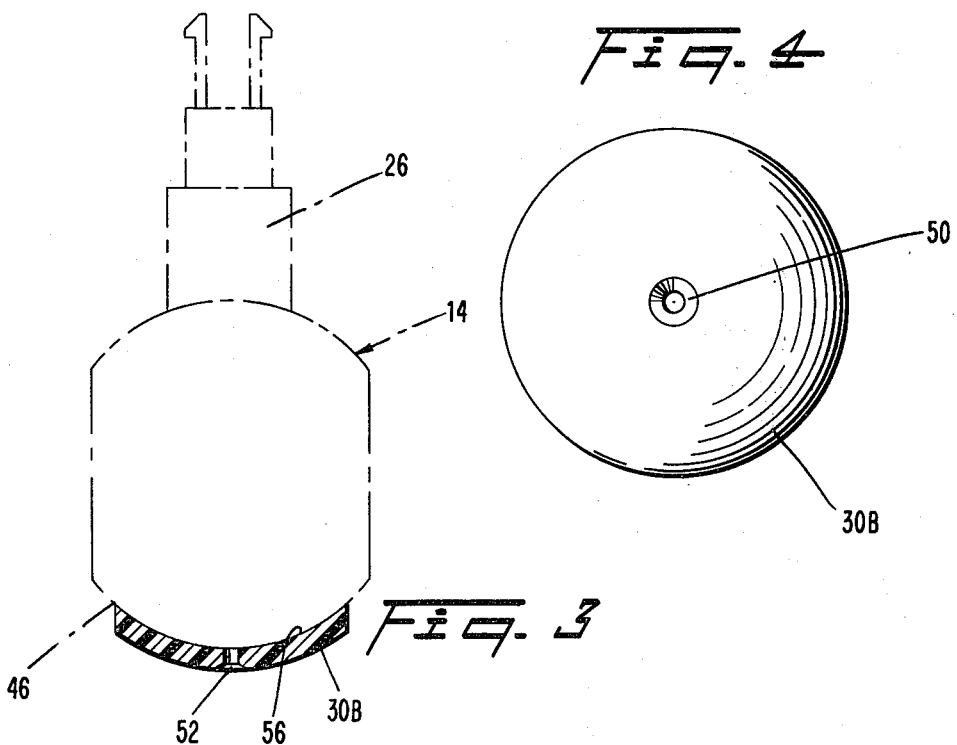

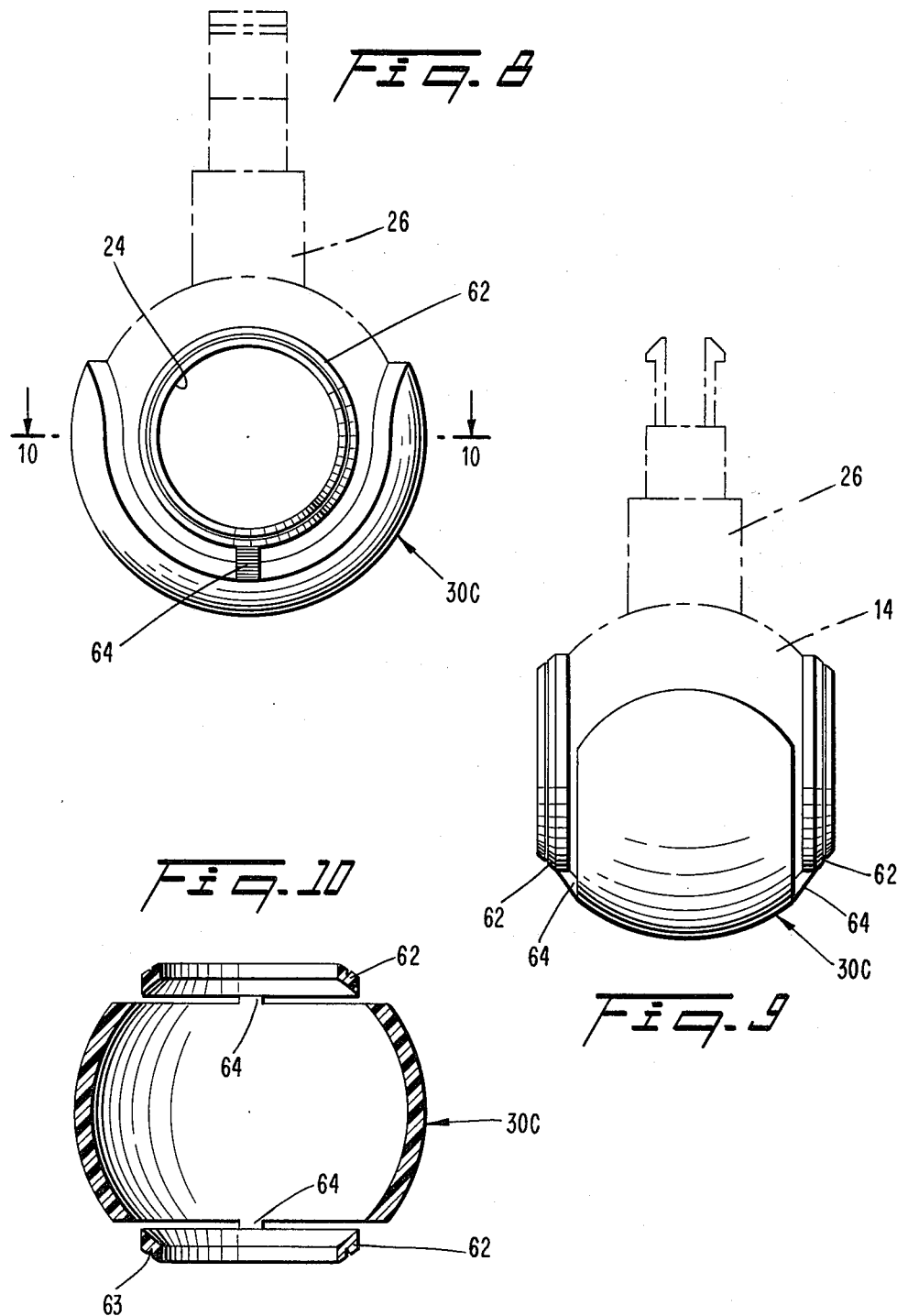

METHOD AND APPARATUS FOR PREVENTING THERMAL DAMAGE TO A PREFORMED PLUG DURING MOLDING OF A HOUSING THEREAROUND

BACKGROUND AND OBJECTS OF THE INVENTION

The present invention relates to rotary plug valves and, in particular, to plug valves in which a housing is molded in place about a preformed rotary plug.

Rotary plug valves are conventional in which a housing forms a through-passage and rotatably mounts an inner plug or gate, e.g., a ball, situated in the through-passage. The ball has a bore therethrough which, when aligned with the through-passage, admits a flow of fluid and, when misaligned prevents such flow. It has heretofore been proposed to form such a valve by preforming the ball member, as from a thermoplastic material for example, placing that ball in a mold and then molding a thermoplastic housing material in-place around the ball (see for example commonly assigned U.S. Pat. No. 4,257,575, and U.S. Pat. Nos. 3,961,770; 3,271,845; and 3,807,692 for disclosures of valves formed in this manner). A pair of seating rings may or may not be placed in the mold around the housing through-passage prior to injection of the housing material.

A disadvantage which arises during such a fabrication technique results from the relatively high temperature of the molten housing material as it is flowed into the cavity surrounding the preformed ball. Unless the ball is formed of a material sufficiently resistant to that heat level, the ball may become welded to the housing, especially in the region where the molten housing is introduced since temperatures are highest there. In many instances, this problems dictates that the ball be formed of a different material than the housing (i.e., of a more heat resistant material). However, if the ball and housing comprises different materials, it may be difficult to provide a valve whose components exhibit common characteristics, such as the same chemical resistance for example. For this reason it may be difficult, with such a technique to provide a valve which is capable of being employed in certain chemically corrosive environments.

It should also be mentioned that even in cases where the ball is formed of a material having a higher temperature resistance than the housing material in order to avoid the above-described welding problem, the high temperatures in the region where molten housing material is introduced may still cause damage to the ball.

It is, therefore, an object of the present invention to minimize or obviate problems of the type discussed above.

Another object of the present invention is to provide novel methods and apparatus for molding a valve housing around a preformed plug while minimizing the risk of heat-induced damage to the plug when introducing molten housing material therearound.

An additional object of the invention is to provide such methods and apparatus while assuring that no leakage occurs around the plug during usage of the valve.

An additional object of the present invention is to enable the plug to be formed of a material having a heat-resistance which is equal to, greater than, or less than that of the housing material.

SUMMARY OF THE INVENTION

These objects are achieved by the present invention which involves a method of forming a rotary plug valve of the type comprising a housing formed of a polymer and a rotary plug disposed in a through-passage of the housing. The plug is formed of a polymer and includes a bore selectively alignable with the through-passage to admit the passage of fluid. A shield formed of a polymer is attached to the plug by snap-fitting the shield onto the plug. The shield has an inner surface conforming to the periphery of the plug. The plug and shield assembly is positioned within a cavity of a mold, the cavity corresponding to the shape of the housing. A molten polymer is introduced into the cavity to fuse to the shield and form the housing around the plug.

Preferably, the polymer comprises a thermoplastic polymer.

In accordance with the present invention, it is also possible to provide the shield with integrally formed circular seat rings which bear against the ball within the mold cavity. The seat rings are enclosed on all surfaces by the housing material except the surface next to the ball and therefore are accurately located in the housing.

THE DRAWINGS

These objects and advantages of the invention will become apparent from the following detailed description of a preferred embodiment thereof, in connection with the accompanying drawings in which like numerals designate like elements, and in which:

FIG. 1 is a longitudinal sectional view through a portion of a valve fabricated in accordance with the present invention;

FIG. 2 is a longitudinal sectional view through a mold depicting a preformed ball seated within a mold cavity preparatory to injection of a molten housing material into the cavity;

FIG. 3 depicts a shield according to the present invention mounted on a preformed ball (shown in phantom), the shield being depicted in cross-section;

FIG. 4 is a bottom view of the shield depicted in FIG. 3;

FIG. 8 depicts another preferred form of shield mounted on a ball (depicted in phantom), the shield being provided with integral seat rings;

FIG. 9 is a side elevational view of the assembly depicted in FIG. 8;

FIG. 10 is a sectional view through the shield depicted in FIG. 8; and

FIG. 11 is a fragmentary side view of the modified ball with the nipple.

DETAILED DESCRIPTION OF PREFERRED EMBODIMENTS OF THE INVENTION

Figure 5:
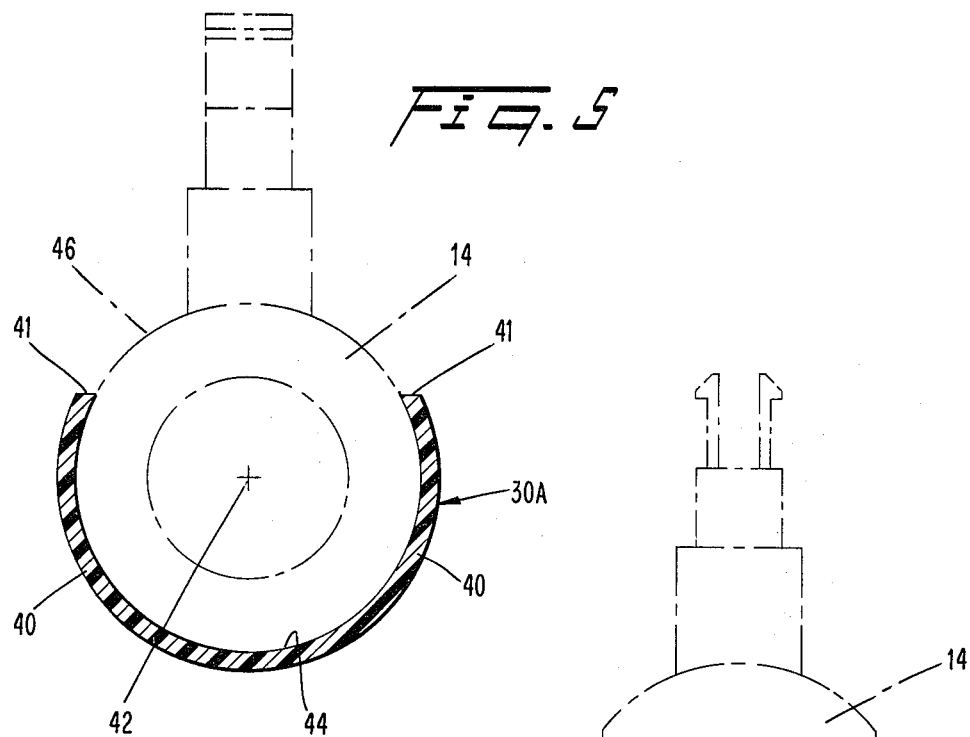
FIG. 5 depicts another preferred form of shield mounted on a ball (depicted in phantom), the shield being shown in cross-section.

A plug valve 10 according to the present invention is depicted in FIG. 1. The valve comprises a housing 12 and a plug or gate 14, preferably a spherical ball, rotatably disposed within a spherical seating surface 21 of the housing. The ball and housing are preferably each formed of a polymer, preferably a thermoplastic polymer. The housing includes a pair of cylindrical end sections 16 which define a through-passage 18. A central seal section 20 of the housing is preferably integrally formed with the end sections, although the latter could be separate members which are fastened in place.

The central seal section 20 includes a pair of circular seating rings 22 formed of a soft anti-friction material such as Teflon. Each seating ring includes a front side which contacts the outer periphery of the ball, and a back side embedded in the housing. For further details of these seating rings, attention is directed to afore-mentioned U.S. Pat. No. 4,257,575 whose disclosure is incorporated by reference herein.

The ball 14 includes a central bore 24 which can be selectively aligned with the through-passage 18 by rotation of a stem portion 26 of the ball 14, the stem extending through a projection of the housing 12. A handle 28 is connected to the stem to facilitate manual rotation thereof.

Embedded within the housing is a shield 30. The shield is integrally joined to the housing, i.e., the shield is stationary and includes an inner surface which defines a continuation of the seating surface 21 of the housing.

Fabrication of the valve is achieved by initially forming the ball 14 of a desired material. The shield 30 is then attached to the ball in a manner to be discussed. The ball-shield assembly is installed within the cavity 32 of a mold 34 (FIG. 2) which is configured in the desired shape of the valve housing 12. A pair of cores 36 are positioned through the bore 24 of the ball and are also configured in accordance with the desired housing shape. If the seating rings 22 are to be provided in the valve (they are optional), the rings are mounted on the cores 36 and are pressed against the ball by projections on the core as explained in the aforementioned U.S. Pat. No. 4,257,575. Molten housing material, a polymer, is injected into the cavity 32 and encompasses the ball while fusing to the shield. Upon hardening, the polymer can adhere to the shield and forms the valve housing 12.

The function of the shield during fabrication of the valve is to protect the ball from damage by the high temperatures occurring in and adjacent the region where molten polymer is introduced into the cavity.

The shield, like the ball and housing, is formed of a polymer which is preferably thermoplastic. Examples of a suitable thermoplastic polymer are PVC, CPVC, polypropylene, polyacetal, and polyolefin. The ball, shield, and housing can be formed of the same material or different materials.

For example, it may be desirable to form the ball, shield, and housing all of CPVC. Alternatively, the ball and shield could be formed of CPVC, and the housing formed of PVC. It is also possible to form the shield of an anti-friction material such as Teflon in order to further facilitate rotation of the ball. This would be especially advantageous in cases where the housing is molded of a high-shrink material such as polypropylene.

The molten housing material accurately conforms to the shape of the shield and therefore holds the shield in place.

The heat resistance exhibited by the ball may be greater than, equal to, or less than that of the molten housing material.

In cases where the material of the ball exhibits the same or less heat resistance than the housing material, the shield prevents a welding or heat fusion of the ball to the housing which would otherwise occur. Even in cases where the ball material is of greater heat resistance than the housing material, the shield still protects the ball against damage which could occur in the high temperature region of the mold.

Figure 6:
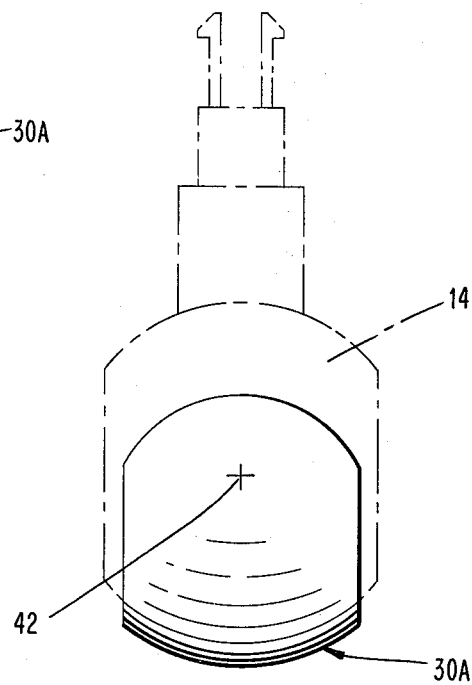
FIG. 6 is a side elevational view of the assembly depicted in FIG. 5.
Figure 7:
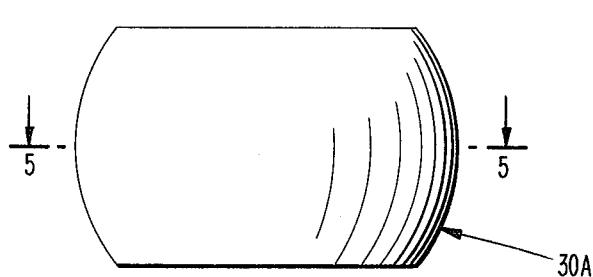
FIG. 7 is a bottom view of the shield depicted in FIG. 5.

One preferred form of the shield is depicted in FIGS. 5-7, wherein the shield 30A is of generally U-shaped construction and includes a pair of leg portions 40 and ends 41 of which extend beyond the elevation of the geometric center 42 of the ball 14. The shield actually comprises a segment of a sphere, with the diameter of the inner surface 44 of the shield corresponding to the diameter of the outer periphery 46 of the ball 14, such that no leakage can occur between those surfaces when the valve is in use. Installation of the shield 30A is achieved by sliding the shield 30A onto the ball 14, whereupon the leg portions 40 of the shield spread apart, due to the inherent resiliency of the shield structure. After the ends of the legs pass sufficiently beyond the geometric center 42 of the ball, the leg portions snap into place against the ball to lock the shield in place.

The shield is sized to cover those portions of the ball which are subjected to destructively high temperatures in the mold. Once the housing has been fabricated and has been formed around the shield, the shield no longer performs a shielding function, but rather simply functions as a part of the housing and seating surface 21. The ball is rotatable relative to the housing and the shield to open and close the central passage 18.

An alternate configuration of the shield is depicted in FIGS. 3 and 4. The shield 30B shown therein is configured as a sphere segment smaller than the segment 30A described earlier. The shield 30B includes a hole 50 and the ball 14 includes a small nipple 52 diametrically opposite the stem 26 of the ball. The nipple 52 has an enlargement 54 at an outer end thereof. The hole 50 enables the shield 30B to be snap-mounted over the enlargement 54 of the nipple 52. In this regard, the enlargement 54 is resiliently deformed as it passes through the hole and then resumes its normal size to retain the shield in place.

The nipple is aligned with the turning stem 26 of the ball to form a continuation of the turning axis for the ball.

It will be appreciated that an inner spherical surface 56 of the shield 30B is of the same diameter as the ball outer periphery 46 and thus is maintained snugly thereagainst by means of the snap-lock connection. No irregularities exist between the surfaces 56, 46 which could later lead to leakage between the ball and shield during usage of the valve.

The shield 30B protects less of the ball 14 than the afore-described shield 30A and thus is not preferably used when a greater degree of protection is needed.

In FIGS. 8-10 there is depicted another preferred configuration. A shield 30C is similar in configuration to that disclosed in connection with FIGS. 5-7. The shield carries circular seats 62 similar to the seats 22 earlier described that form the sealing surfaces against which the end edges of the ball bear. Such circular seats include annular grooves 63 on their backsides into which the molten housing material may flow when injected into the cavity to aid in positioning and holding the seats to the housing. The rings are integral with the shield, being connected therewith by means of integral tabs 64. The tabs 64 are flexible to enable the seats to be mutually separated, allowing the ball to be inserted therebetween and to snap into the shield 30C. The shield 30C and seats 62 are preferably molded of one-piece of the same material.

It will be appreciated that by mounting the seats 62 on the snap-on shield, the step of locating the seats within the mold cavity during fabrication of the valve housing is simplified. Fewer parts need be loaded into the mold and the ball seats themselves become less expensive to fabricate.

It should be pointed out that the concept of applying a low friction member or coating to a rotary member and then molding a housing therearound is not novel. Such a concept is disclosed, for example in U.S. Pat. Nos. 3,094,376 and 3,202,749 where it is desired to facilitate rotation of a ball joint. Those patents disclose ball joints wherein a coating of low friction material is applied to a metal ball. Thereafter, a plastic housing is molded around the coated ball. As described in the '749 patent, the coating may be applied in the form of a cap which is inserted over the ball and then deformed around and against the ball. A strip is then wrapped around that deformed portion of the cap and bonded thereto.

It will be appreciated that the shield according to the present invention is applied to a valve gate, not a ball joint, and requires no deformation. Actually, if the shield according to the present invention were deformed against the ball, there would not likely be created a fluid-tight engagement between the ball and shield and leakage would likely occur. Such a risk is not present in a ball joint of the '376 and '749 patents, nor is there the risk of the housing welding to the ball of the ball joint in those patents, since the ball is formed of metal.

Fabrication of the valve is achieved by forming the ball of a suitable thermoplastic material. The shield 30A or 30B or 30C is then attached to the ball by the snap-fit connection. Next, the ball and shield unit is installed in the mold cavity 32 configured in the desired shape of the housing. The cores 36 are positioned through the bore of the ball, which cores are also configured in accordance with the desired housing shape.

Molten polymer is injected into the cavity 32 and encompasses the ball while fusing to the shield. Upon hardening, the polymer is in intimate contact with the shield and forms the valve housing. Importantly, the housing is not fused to the ball. In this regard, the shield performs its function during valve fabrication by protecting the ball against fusion of damage in the region where the molten housing material is introduced and where temperatures are highest in the cavity 32. Thus, even though the ball may be formed of a material having a heat resistance which is more, less, or equal to that of the housing material, there is less likelihood that the ball will be damaged or welded to the housing.

In accordance with the present invention, the risk of damage or fusion of the ball during a housing fabrication step is minimized, regardless of the relative heat resistance of the ball and housing materials. This is achieved without the risk of leakage occurring around the ball during use of the valve. It is no longer necessary to form the ball or a material which is of greater heat resistance than the housing material. Hence, a greater degree of flexibility occurs in the design of the valve to resist chemical attack by the fluids being conducted. As is apparent, the present invention is also applicable when the ball is formed of a material having the same or greater heat resistance than the housing material, because the shield protects against thermal damage.

Although the invention has been described in connection with preferred embodiments thereof, it will be appreciated by those skilled in the art that modifications, substitutions, additions and deletions may be made, without departing from the spirit or scope of the invention as defined in the appended claims.

What is claimed is:

1. A method of forming a rotary plug valve of the type comprising a housing formed of a polymer and a rotary plug disposed in a through-passage of said housing;

providing a rotary plug having a bore extending diametrically therethrough and formed of a polymer;

forming a shell-like shield of a resilient polymeric material of a shape to closely seat against and cover a portion of the peripheral surface of the plug, attaching the shield by snap-fitting said shield onto said plug with its inner surface conforming to the peripheral surface of said plug;

positioning said plug and shield assembly within a cavity of a mold on a mold core means for supporting said assembly and forming the through-passage, said cavity corresponding to the shape of said housing, and introducing a molten polymer into said cavity at a point whereat the shield is interposed between the polymer and the plug to shield the plug from the thermal energy of the molten polymer as the polymer is initially introduced into the cavity and to form said housing around said plug and bond said shield to the housing formed by the polymer.

2. A method according to claim 1, wherein said plug, shield and housing are formed by a thermoplastic polymer.

3. A method according to claim 1, wherein said shield comprises a generally U-shaped member having a pair of resiliently yieldable leg portions spreading the leg portions to pass around the plug and releasing them to snap back onto said plug during attachment of said shield to said plug.

4. A method according to claim 3 wherein the plug periphery is spherical, including the step of integrally forming said shield with a pair of diametrically opposite ring-shaped seats joined thereto and aligned on a common axis, said attaching step including positioning said seats around the opposite ends of said bore in said plug.

5. A method according to claim 4 including the step of arranging the seals about an axis positioned 90° from said leg portions.

6. A method according to claim 1, wherein said shield has a pair of ring-shaped seats joined thereto, said attaching step comprising positioning said seats around ends of said bore of said plug, bonding said seats to the housing as the housing is formed.

7. A method according to claim 1, including the steps of forming said plug of a material which has less heat resistance than the material of said housing.

8. A method according to claim 1 including the steps of providing an alignment nipple on the plug on an axis positioned 90° from the axis of the bore, seating the shield over the nipple to position the shield on the plug.

9. A method according to claim 1 including the step of cooling the molten polymer below the temperature at which it will surface damage the plug before the polymer flows beyond ends of the shield.

10. A method according to claim 1 wherein said shield has a pair of oppositely extending leg portions of a length to extend beyond a plane passing through the geometric center of the ball, causing said leg portions to clamp against the plug.

11. A method according to claim 10 wherein a pair of oppositely positioned ring-shaped seals are integrally connected to the shield and positioned intermediate said leg portions; seating one of said seals around each of the ends of the bore.

12. A method of forming a rotary plug valve of the type comprising a housing formed of a polymer and a rotary plug disposed in a through-passage of the housing;
- providing a plug of a molded polymeric material, the plug having a bore extending diametrically therethrough;
- providing a resilient shell-like U-shaped preformed shield of polymeric material having oppositely positioned portions of a length to extend beyond a plane extending through the geometric center of the ball, the inner surface of the shield being shaped to seat against the exterior surface of the plug;
- attaching said shield to the plug by spreading said portions and seating the shield over an end of the plug disposed between the ends of said bore and allowing said portions to clamp the plug and seat the shield firmly against the exterior surface of the plug to cover substantially less than the entire surface of the plug;
- positioning the plug and shield assembly within a cavity of a mold on a mold core means for supporting said assembly and forming the through-passage, the cavity corresponding in shape to that of the housing;
- introducing a molten polymer into said cavity at a point whereat the shield is interposed between the polymer and the plug to shield the plug from the thermal energy of the molten polymer as the polymer is initially introduced into the cavity and to form said housing around said plug and bond said shield to the housing formed by the polymer.

13. A method according to claim 12 including the step of integrally forming said shield with a pair of diametrically opposite ring-shaped seats joined thereto and aligned on a common axis, said attaching step including positioning said seats around the opposite ends of said bore in said plug.

14. A method according to claim 13 wherein said shield has a pair of oppositely extending leg portions of a length to extend beyond a plane passing through the geometric center of the ball.

15. A method according to claim 14 wherein said shield includes a pair of ring-shaped seals, means integrally connecting each of the seals to the shield, seating the seals around the ends of the bore as the shield is assembled to the plug.

16. A method according to claim 12 including the steps of providing an alignment nipple, on the plug on an axis positioned 90° from the axis of the bore, seating the shield over the nipple and securing it thereto to hold the shield against movement relative to the plug during introduction of the polymer forming the housing.

17. A method according to claim 12, including the steps of forming said plug and shield of the same material.

18. A method according to claim 12, including the steps of forming said plug, shield and housing of the same material.

19. A method according to claim 12, including the step of forming said housing and plug of the same material.

20. A method according to claim 12 wherein said shield has a pair of ring-shaped seats joined thereto, said attaching step comprising positioning said seats around ends of said bore of said plug, bonding said seats to the housing as the housing is formed.

21. A method of forming a rotary plug valve of the type comprising a housing formed of a polymer and a rotary plug disposed in a through-passage of the housing;
- providing a plug of a molded polymeric material, the plug having a bore extending diametrically therethrough and a stem and nipple diametrically positioned with respect to each other along an axis positioned 90° from the axis of said bore;
- providing a shell-like preformed shield of polymeric material of a size to cover substantially less than the entire surface of the plug and having an inner surface shaped to seat closely against the exterior surface of the plug and an opening to receive the nipple;
- attaching said shield to the plug by seating the shield over said nipple to seat the shield firmly against the exterior surface of the plug;
- positioning the plug and shield assembly within a cavity of a mold on a mold core means for supporting said assembly and forming the through-passage, the cavity corresponding in shape to that of the housing;
- introducing a molten polymer into said cavity at a point whereat the shield is interposed between the polymer and the plug to shield the plug from the thermal energy of the molten polymer as the polymer is initially introduced into the cavity and to form said housing around said plug and bond said shield to the housing formed by the polymer.

* * * * *